(12) United States Patent
Byun et al.

(10) Patent No.: US 10,046,679 B2
(45) Date of Patent: Aug. 14, 2018

(54) METHOD AND APPARATUS FOR CONTROLLING AIR CELL IN SEAT

(71) Applicant: HYUNDAI DYMOS INCORPORATED, Seosan-si, Chungcheongnam-do (KR)

(72) Inventors: Deuk Kyu Byun, Gunpo-si (KR); Chang Won Lee, Osan-si (KR)

(73) Assignee: HYUNDAI DYMOS INCORPORATED, Chungcheongnam-Do (KR)

( * ) Notice: Subject to any disclaimer, the term of this patent is extended or adjusted under 35 U.S.C. 154(b) by 72 days.

(21) Appl. No.: 15/370,525

(22) Filed: Dec. 6, 2016

(65) Prior Publication Data

US 2017/0166099 A1    Jun. 15, 2017

(30) Foreign Application Priority Data

Dec. 15, 2015   (KR) .................. 10-2015-0179579

(51) Int. Cl.
| | |
|---|---|
| *B60N 2/42* | (2006.01) |
| *B60N 2/44* | (2006.01) |
| *B60N 2/02* | (2006.01) |
| *B60N 2/90* | (2018.01) |

(52) U.S. Cl.
CPC ......... *B60N 2/4415* (2013.01); *B60N 2/0244* (2013.01); *B60N 2/914* (2018.02); *B60N 2002/0268* (2013.01)

(58) Field of Classification Search
CPC ........ B60N 2/42; B60N 2/665; B60N 2/0244; B60N 2/0284; B60N 2/806; B60N 2/4279; B60N 2002/0268; A61H 2201/0134; A61H 2201/0149; A61H 2201/0207; A61H 2201/5071; A47C 4/54; A47C 27/083; A47C 27/17; A47C 7/744
USPC ........ 701/36, 49; 307/10.1, 10.6; 297/217.3, 297/284.1, 284.4, 284.3
See application file for complete search history.

(56) References Cited

U.S. PATENT DOCUMENTS

| | | | | |
|---|---|---|---|---|
| 6,098,000 | A  * | 8/2000 | Long .................. | A47O 4/54 |
| | | | | 701/49 |
| 2004/0066023 | A1* | 4/2004 | Joseph ............... | B60R 21/017 |
| | | | | 280/735 |
| 2007/0182139 | A1* | 8/2007 | Tabe ................. | B60R 21/01516 |
| | | | | 280/735 |

FOREIGN PATENT DOCUMENTS

| | | |
|---|---|---|
| JP | 2009-136543 A | 6/2009 |
| KR | 10-2004-0098931 A | 11/2004 |
| KR | 10-2005-0089230 | 9/2005 |
| KR | 10-2010-0053925 A | 5/2010 |

* cited by examiner

*Primary Examiner* — Dalena Tran
(74) *Attorney, Agent, or Firm* — Brinks Gilson & Lione

(57) ABSTRACT

The present disclosure provides a method and an apparatus for controlling an air cell in a seat. It includes: an air cell provided in the seat; a pressure sensor configured to measure a pressure in the air cell; an actuation switch configured to enable an operation of injecting or discharging air into or from the air cell; and a control unit input with the measured air cell pressure value.

7 Claims, 4 Drawing Sheets

METHOD AND APPARATUS FOR CONTROLLING AIR CELL IN SEAT

CROSS-REFERENCE TO RELATED APPLICATION

This application claims priority to and the benefit of Korean Patent Application No. 10-2015-0179579 filed on Dec. 15, 2015, which is incorporated herein by reference in its entirety.

FIELD

The present disclosure relates to a technology that controls an air cell in a seat.

BACKGROUND

The statements in this section merely provide background information related to the present disclosure and may not constitute prior art.

Air cells (bolster: airbag) may be provided at both sides of a seat back of a vehicle so as to stably support a body of a passenger which sits on a seat and air in the air cell is injected or discharged by an air pressure system including a motor, an air pump, an actuation switch, and the like.

FIG. 1 is a diagram for describing a method for controlling the air cell air pressure system and an injection time of air injected in the air cell is calculated and stored by controlling an actuation or switch operation time of the motor per second when a vehicle is turned off and thereafter, the air is injected in each air cell 1 as long as the air injection time stored when the vehicle is turned off before the vehicle is turned on to expand and restore the air cell 1.

However, in the related art, an air amount injected in the air cell is determined based on only the air injection time or the motor actuation time, and as a result, an error occurs depending on time accumulation and the intake and outtake characteristics of the air cell are excluded. Therefore, it is impossible to specifically control the air amount in the air cell.

SUMMARY

The present disclosure provides a method and an apparatus for controlling an air cell in a seat which specifically control and actuate an air amount of an air cell by implementing an algorithm considering intake and outtake characteristics of an air cell while measuring the pressure of the air cell to enhance the performance reliability and marketability of the air cell.

One form of the present disclosure provides an apparatus for controlling an air cell in a seat, including: an air cell provided in the seat and supporting a body of a passenger who sits on the seat; a pressure sensor configured to measure a pressure in the air cell; an actuation switch configured to enable an operation of injecting or discharging air into or from the air cell; and a control unit input with the measured air cell pressure value, the control unit configured to: store an intake time when the air is injected into the air cell, and an outtake time when the air is discharged from the air cell during the outtake operation of the actuation switch, calculate a converted intake time from an air amount required for filling the air as full as a current air cell by using a function between the intake time and the outtake time, store the air cell pressure value after a predetermined time elapsed from the time when the outtake time is stored, and control the air cell to be expanded and restored by the stored air cell pressure value and the converted intake time when a vehicle is turned on after the vehicle is turned off.

Another form of the present disclosure provides a method for controlling an air cell provided in a seat, including: an intake time storing step for storing an intake time when air is injected into the air cell in a control unit; an outtake time storing step for storing an outtake time when the air is discharged from the air cell during an outtake operation of the actuation switch; a calculating step for calculating, by the control unit, a converted intake time from an air amount required for filling the air as full as a current air cell by using a function between the intake time and the outtake time; a restored outtake pressure storing step for storing the air cell pressure value after a predetermined time elapsed from the time when the outtake time is stored in the control unit; and an expanding and restoring step for controlling, by the control unit, the air cell to be expanded and restored with a use of the stored air cell pressure value and the converted intake time when a vehicle is turned on after the vehicle is turned off.

The method may further include a restored intake pressure storing step of storing the air cell pressure value after a predetermined time from the time when the intake time is stored, after the intake time storing step.

The intake time in the intake time storing step may be a motor actuation time when a motor is actuated to automatically expand and restore the air cell with the use of the stored air cell pressure value and the converted intake time when the vehicle is turned on.

The intake time in the intake time storing step may be a motor actuation time when the motor is actuated in link with the actuation switch during an intake operation of the actuation switch when the vehicle is turned on.

The outtake time storing step may include a preliminary restored pressure storing step for storing the air cell pressure value when the outtake operation of the actuation switch ends.

In the calculating step, the converted intake time may be calculated through addition and subtraction of the intake time and the outtake time and the outtake time used for the calculated converted intake time may be calculated by adding a predetermined reference value to the actual outtake time.

According to forms of the present disclosure, an outtake time is stored from the time when the outtake operation of an actuation switch starts to the time when the outtake operation of the actuation switch ends and further, the pressure of an air cell is stored at the time when a predetermined time elapsed after the outtake time is stored. Accordingly, since a converted intake time calculated by using the outtake time and an intake time and the air cell pressure value are stored when a vehicle is turned off for expansion and restoration of the air cell to take place when the vehicle is turned on, an error is reduced in controlling an air amount in the air cell, and as a result, actuation reliability and marketability of the air cell are enhanced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
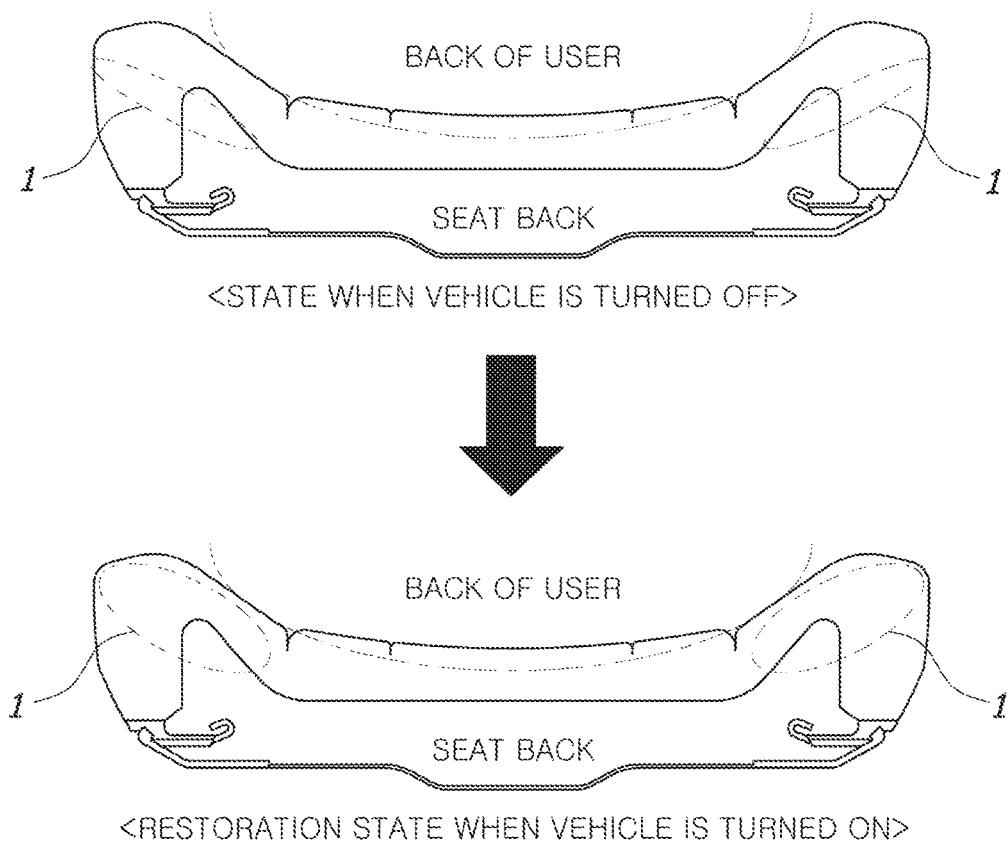
FIG. 1 is a diagram describing a state in which both air cells are expanded according to an intake time when an air cell is expanded in the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An apparatus for controlling an air cell in a seat according to the present disclosure is generally configured to include an air cell 10, a pressure sensor 11, an actuation switch 15, and a control unit 13.

Figure 2:
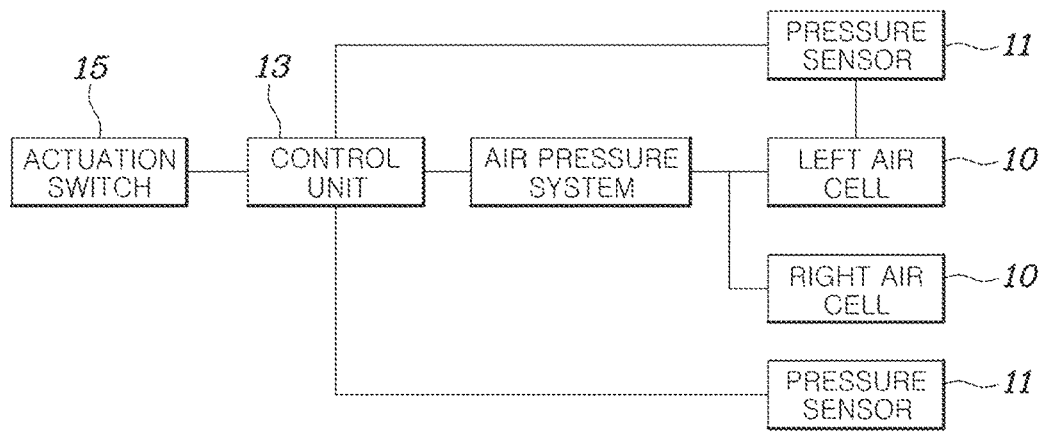
FIG. 2 is a diagram schematically illustrating an overall configuration of an apparatus for controlling an air cell.
Figure 3:
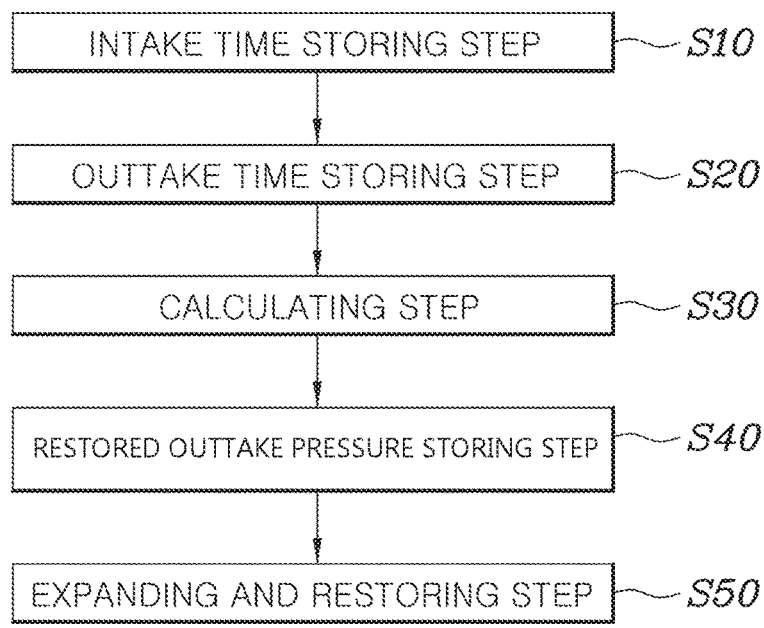
FIG. 3 is a diagram sequentially illustrating all steps of a method for controlling an air cell.
Figure 4:
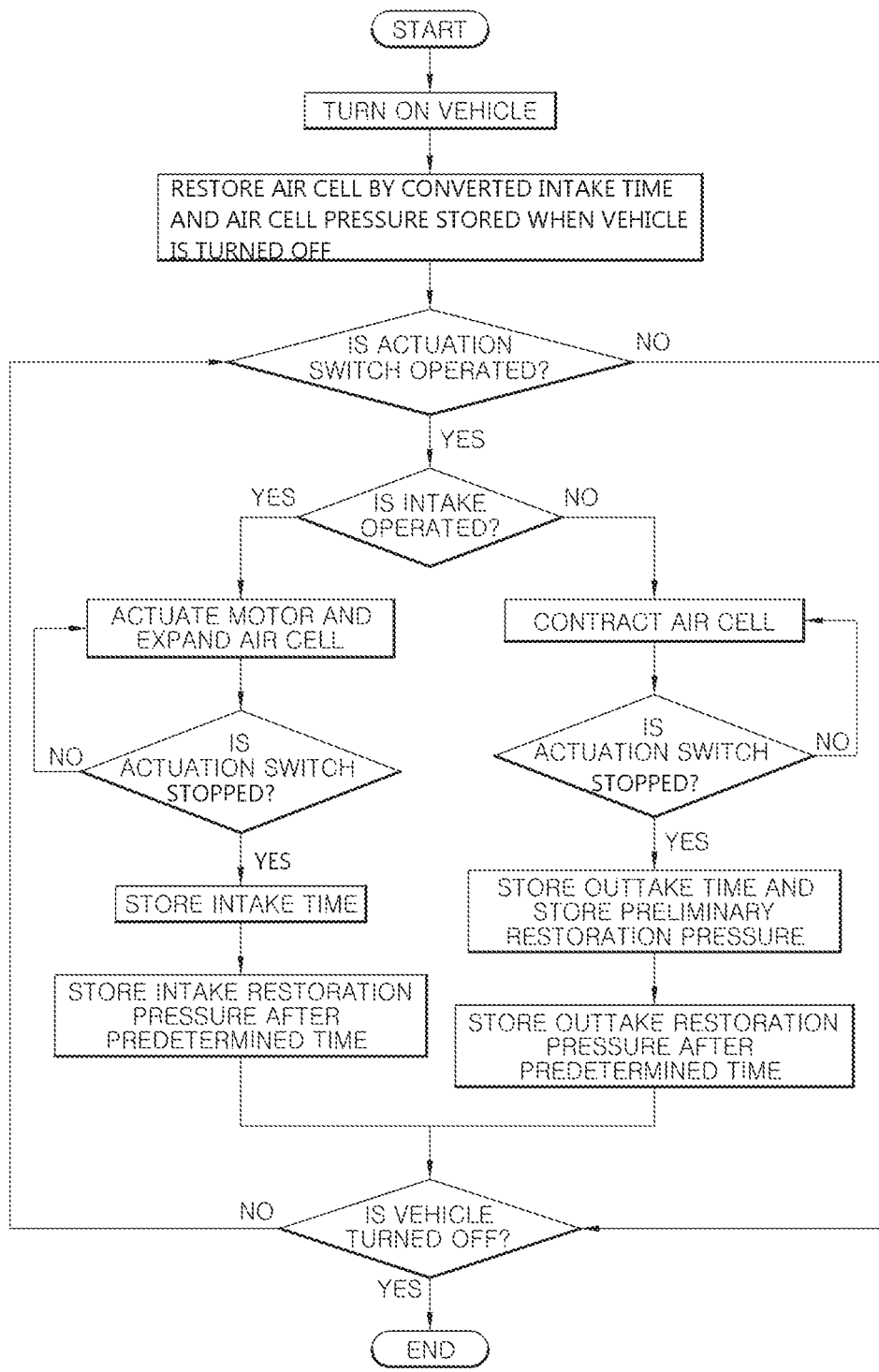
FIG. 4 is a flowchart describing a control flow of a method for controlling an air cell.
Figure 5:
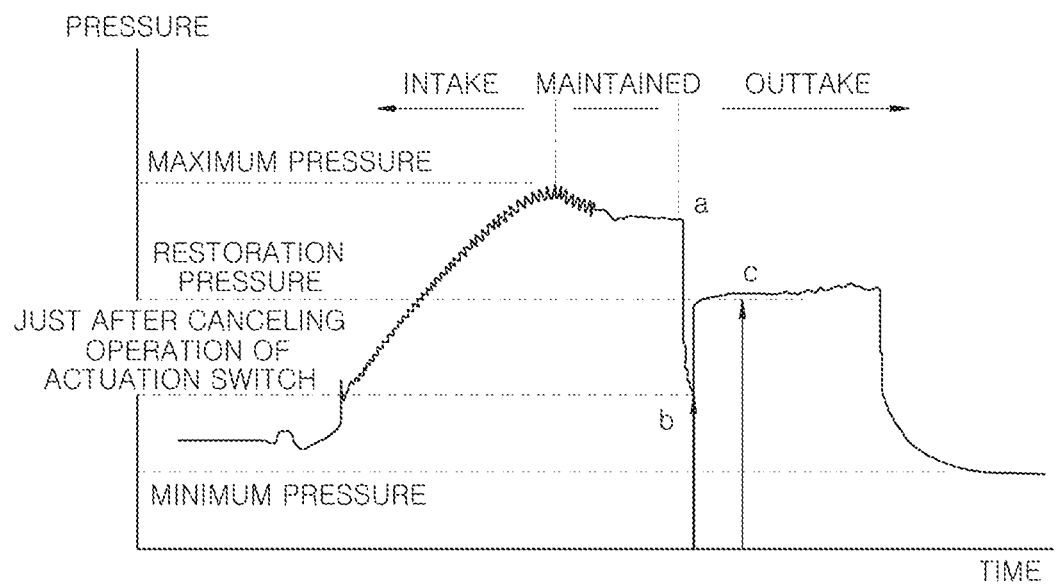
FIG. 5 is a diagram describing a change of pressure to a time when the air cell is expanded and restored in the case of turn-on of a vehicle and an outtake operation of an actuation switch and in the case of turn-off of the vehicle.

Referring to FIGS. 2 and 5, the apparatus is configured to include: an air cell 10 provided in the seat and supporting a body of a passenger who sits on the seat; a pressure sensor 11 configured to measure a pressure in the air cell 10; an actuation switch 15 configured to enable an operation of injecting or discharging air into or from the air cell 10; and a control unit 13 input with the measured air cell pressure value, the control unit configured to: store an intake time when the air is injected into the air cell 10, and an outtake time when the air is discharged from the air cell during the outtake operation of the actuation switch, calculate a converted intake time from an air amount required for filling the air as full as a current air cell 10 by using a function between the intake time and the outtake time, store the air cell pressure value after a predetermined time elapsed from the time when the outtake time is stored, and control the air cell 10 to be expanded and restored by the stored air cell pressure value and the converted intake time when a vehicle is turned on after the vehicle is turned off.

Herein, the air cell 10 may be installed at each of two sides of a seat back and the air may be injected into and discharged from the air cell 10 by an air-pressure system.

That is, an air pump is connected to the air cell 10 to inject the air into the air cell 10 and the air pump may be actuated by a motor. Further, a valve is installed between the air pump and the air cell 10 to discharge the air in the air cell 10.

In addition, the pressure sensor 11 may be provided in each air cell 10 so as to measure the pressure of each air cell 10 and provided in the air cell 10 or on a path on which the air is injected from the air pump into the air cell 10.

Further, referring to FIG. 5, when a predetermined time before the control unit 13 stores the air cell pressure value, after an outtake operation of the actuation switch 15 is stopped, the pressure of the air cell 10 rapidly decreases and thereafter, partially restored due to a characteristic of the air cell 10, and as a result, the predetermined time may be a time required from the time when the discharge operation of the actuation switch 15 is stopped up to the time when the air cell pressure is partially restored and the predetermined time may be determined by an experiment.

Meanwhile, referring to FIGS. 2 to 5, a method for controlling an air cell 10 provided in a seat is configured to include: an intake time storing step (S10) for storing an intake time when air is injected into the air cell 10 in a control unit; an outtake time storing step (S20) for storing an outtake time when the air is discharged from the air cell 10 during an outtake operation of the actuation switch 15; a calculating step (S30) for calculating, by the control unit, a converted intake time from an air amount required for filling the air as full as a current air cell 10 by using a function between the intake time and the outtake time; a restored outtake pressure storing step (S40) for storing the air cell pressure value after a predetermined time elapsed from the time when the outtake time is stored in the control unit; and an expanding and restoring step (S50) for controlling, by the control unit, the air cell 10 to be expanded and restored by the air cell pressure value stored in the restored outtake pressure storing step (S40) and the converted intake time converted in the calculating step (S30) when a vehicle is turned on after the vehicle is turned off.

Referring to FIG. 5, the outtake time required from the time (time a) when the outtake operation of the actuation switch 15 starts simultaneously with stopping the outtake operation of the actuation switch 15 up to the time when the outtake operation of the actuation switch 15 ends (time b) is stored and further, the pressure of the air cell 10 is stored at the time (time c) when a predetermined time elapsed after storing the outtake time.

Accordingly, since an intake conversion time calculated by using the outtake time and an intake time and the pressure value of the air cell are stored when a vehicle is turned off to expand and restore the air cell 10 by using the air cell pressure value and the converted intake time when the vehicle is turned on, an air amount accumulation error is significantly reduced as compared with the air cell control method considering the intake/outtake time in the related art in controlling an air amount in the air cell 10, and as a result, actuation reliability and marketability of the air cell 10 are enhanced.

Herein, when the air cell 10 is expanded and restored, the restoration of the air cell may be controlled by a map forming a relationship between the air cell pressure value and the intake conversion time, and a motor actuation time.

If the outtake operation time of the actuation switch 15 is not stored at time b, but stored in at time c, when the vehicle is turned off and thereafter, turned on again to restore the air cell 10, the control unit 13 misdetects that the outtake operation is performed for a time longer than the time when the user performs the outtake operation. Accordingly, the air cell 10 needs to be restored by subtracting the time as long as time a to time b and the air cell 10 is restored by additionally subtracting the time required from time b to time c, and as a result, the air cell 10 may not be sufficiently restored.

In addition, after the intake time storing step (S10), the method may be configured to further include a restored intake pressure storing step of storing the air cell pressure value after a predetermined time from the time when the intake time is stored.

Herein, when the predetermined time before storing the air cell pressure value is described with reference to FIG. 5, after the outtake operation of the actuation switch 15 is stopped, the pressure of the air cell 10 slightly decreases and thereafter, is maintained at a predetermined pressure due to the characteristic of the air cell 10, and as a result, the predetermined time may be a time required from the time when the intake operation of the actuation switch 15 is stopped up to the air cell 10 is maintained at the predetermined pressure and the predetermined time may be determined by the experiment and may be approximately several seconds.

Moreover, the intake time in the intake time storing step (S10) may be a motor actuation time when a motor is actuated to automatically expand and restore the air cell by the air cell pressure value and converted intake time stored when the vehicle is turned off when the vehicle is turned on.

That is, since the motor is actuated in link with operating the actuation switch 15, the air cell 10 may be automatically expanded and restored by combining the motor actuation time and the air cell pressure value stored when the vehicle is turned off when the air is injected in the air cell 10.

Further, the intake time in the intake time storing step (S10) may be a motor actuation time when the motor is actuated in link with the actuation switch when the actuation switch 15 is intake-operated while the vehicle is turned on.

In particular, the outtake time storing step (S20) may include a preliminary restored pressure storing step of storing the air cell pressure at the time when the outtake operation of the actuation switch 15 ends.

That is, referring to FIG. 5, in the case where only the operation time of the actuation switch 15 is stored and the pressure of the air cell 10 is not stored at time b, when an abnormal situation occurs, in which power is cut off to the control unit 13 or the vehicle is turned off at time b, an air value in a current state is lost and it is impossible to smoothly control the air pressure of the air cell 10, and as a result, the air cell pressure value is stored at time b against the abnormal situation.

However, the air cell pressure value stored at time b is the pressure value stored against the abnormal situation and when the pressure is stored at time c, the pressure value at time c is stored as a final pressure value instead of the pressure value stored time b.

Moreover, in the calculating step (S30), the converted intake time is calculated through addition and subtraction of the intake time and the outtake time and the outtake time used for the converted intake time may be calculated as a time increased as compared with the actual outtake time adding a predetermined reference value to the actual outtake time.

That is, for example, when the outtake operation by the actuation switch 15 is performed after the intake time of the air cell 10 which is expanded and restored when it is measured at the time the vehicle is turned on, the converted intake time is calculated by subtracting the outtake time from the intake time.

However, an intake action in which the air is filled in the air cell 10 is a method in which the air is filled at an atmospheric pressure and an outtake action in which the air is discharged from the air cell 10 is a method in which the air is discharged at a higher pressure state than the atmospheric pressure.

Accordingly, a slope for the pressure to the time of the air cell during the outtake is much larger than the slope of the pressure to the time of the air cell 10 during the intake, and as a result, when it is assumed that the intake and the outtake are performed for the same time, the air is relatively slowly filled during the intake and the air is relatively rapidly discharged during the outtake. Therefore, the outtake time is determined by multiplying a time required for actual outtake by a specific amount of variable (3 in the present disclosure) and the converted intake time is calculated by subtracting the outtake time from the intake time.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for controlling an air cell in a seat, the apparatus comprising:
    an air cell provided in the seat and supporting a body of a passenger who sits on the seat;
    a pressure sensor configured to measure a pressure in the air cell;
    an actuation switch configured to enable an operation of injecting or discharging air into or from the air cell; and
    a control unit input with the measured air cell pressure value, the control unit configured to:
        store an intake time when the air is injected into the air cell, and an outtake time when the air is discharged from the air cell during the outtake operation of the actuation switch,
        calculate a converted intake time from an air amount required for filling the air as full as a current air cell by using a function between the intake time and the outtake time,
        store the air cell pressure value after a predetermined time elapsed from the time when the outtake time is stored, and
        control the air cell to be expanded and restored by the stored air cell pressure value and the converted intake time when a vehicle is turned on after the vehicle is turned off.

2. A method for controlling an air cell provided in a seat, the method comprising:
    an intake time storing step for storing an intake time when air is injected into the air cell in a control unit;
    an outtake time storing step for storing an outtake time when the air is discharged from the air cell during an outtake operation of the actuation switch;
    a calculating step for calculating, by the control unit, a converted intake time from an air amount required for filling the air as full as a current air cell by using a function between the intake time and the outtake time;
    a restored outtake pressure storing step for storing the air cell pressure value after a predetermined time elapsed from the time when the outtake time is stored in the control unit; and
    an expanding and restoring step for controlling, by the control unit, the air cell to be expanded and restored with a use of the stored air cell pressure value and the converted intake time when a vehicle is turned on after the vehicle is turned off.

3. The method of claim 2, further comprising:
    after the intake time storing step, a restored intake pressure storing step of storing the air cell pressure value after a predetermined time elapsed from the time when the intake time is stored.

4. The method of claim 2, wherein the intake time in the intake time storing step is a motor actuation time when a motor is actuated to automatically expand and restore the air cell with the use of the stored air cell pressure value and the converted intake time when the vehicle is turned on.

5. The method of claim 2, wherein the intake time in the intake time storing step is a motor actuation time when the motor is actuated in link with the actuation switch during an intake operation of the actuation switch when the vehicle is turned on.

6. The method of claim 2, wherein the outtake time storing step comprises a preliminary restored pressure storing step for storing the air cell pressure value when the outtake operation of the actuation switch ends.

7. The method of claim 2, wherein in the calculating step, the converted intake time is calculated through addition and subtraction of the intake time and the outtake time and the outtake time used for the calculated converted intake time is calculated by adding a predetermined reference value to the outtake time.

* * * * *